(12) United States Patent
Nedwed et al.

(10) Patent No.: US 9,937,474 B2
(45) Date of Patent: Apr. 10, 2018

(54) FLOATING DISPERSANT PASTE

(75) Inventors: Timothy J. Nedwed, Houston, TX (US); Gerard P. Canevari, Cranford, NJ (US); James R. Clark, Fairfax, VA (US)

(73) Assignee: ExxonMobil Upstream Research Company, Spring, TX (US)

( * ) Notice: Subject to any disclaimer, the term of this patent is extended or adjusted under 35 U.S.C. 154(b) by 1219 days.

(21) Appl. No.: 12/518,861

(22) PCT Filed: Dec. 7, 2007

(86) PCT No.: PCT/US2007/025100
§ 371 (c)(1),
(2), (4) Date: Jun. 11, 2009

(87) PCT Pub. No.: WO2008/094236
PCT Pub. Date: Aug. 7, 2008

(65) Prior Publication Data
US 2010/0016452 A1    Jan. 21, 2010

Related U.S. Application Data

(60) Provisional application No. 60/898,350, filed on Jan. 30, 2007.

(51) Int. Cl.
*B01F 17/00*  (2006.01)
*C02F 1/68*   (2006.01)
(Continued)

(52) U.S. Cl.
CPC .......... *B01F 17/0085* (2013.01); *C02F 1/682* (2013.01); *C02F 1/686* (2013.01); *C09K 3/32* (2013.01); *E02B 15/041* (2013.01)

(58) Field of Classification Search
CPC ................................................. B01F 17/0085
(Continued)

(56) References Cited

U.S. PATENT DOCUMENTS 3,676,357 A    7/1972   Ciuti et al.
3,755,189 A    8/1973   Gilchrist et al.
(Continued)

FOREIGN PATENT DOCUMENTS

GB    1 342 591    1/1974
GB    1 343 401    1/1974
(Continued)

OTHER PUBLICATIONS

Becker, K. W. et al., "A New Laboratory Method for Evaluating Oil Spill Dispersants", 1993 International Oil Spill Conference, (1993), pp. 507-510, Tampa, FL.
(Continued)

*Primary Examiner* — Peter Keyworth
(74) *Attorney, Agent, or Firm* — ExxonMobil Upstream Research Company Law Department

(57) ABSTRACT

An agent and a method for dispersing spilled oil, particularly on a body of water. The compound is a viscous dispersant liquid comprising a mixture of surfactants and a viscosifying agent that may be stored, shipped, mixed, and delivered on site using standard equipment and methods. The compound is released as a cohesive, persistent, visible, gel-like or paste-like liquid that floats on water. At least one method includes delivering the viscous dispersant liquid onto an oil spill in a body of water utilizing a jet airplane flying at over about 100 feet and spraying the liquid in large, pea-sized droplets.

9 Claims, 5 Drawing Sheets

(51) Int. Cl.
*C09K 3/32* (2006.01)
*E02B 15/04* (2006.01)

(58) Field of Classification Search
USPC .................. 210/749, 925; 516/53, 63, 73
See application file for complete search history.

(56) References Cited

U.S. PATENT DOCUMENTS

| | | | |
|---|---|---|---|
| 3,770,575 A | 11/1973 | Ball | |
| 3,793,218 A | 2/1974 | Canevari | |
| 3,821,109 A | 6/1974 | Gilchrist et al. | |
| 3,886,067 A | 5/1975 | Miranda | |
| 4,190,531 A | 2/1980 | Falk | |
| 4,197,197 A | 4/1980 | Abaeva et al. | |
| 4,239,915 A | 12/1980 | Falk | |
| 4,266,080 A | 5/1981 | Falk et al. | |
| 4,469,603 A | 9/1984 | Lepain et al. | |
| 4,483,716 A | 11/1984 | Heller | |
| 4,560,482 A * | 12/1985 | Canevari | 210/749 |
| 4,597,893 A * | 7/1986 | Byford et al. | 516/59 |
| 4,764,285 A | 8/1988 | Robbins et al. | |
| 4,830,759 A | 5/1989 | Charlier | |
| 4,978,459 A * | 12/1990 | Bock et al. | 210/749 |
| 5,051,192 A | 9/1991 | Charlier | |
| 5,154,831 A | 10/1992 | Darian et al. | |
| 5,176,713 A | 5/1993 | Dixit et al. | |
| 5,244,574 A * | 9/1993 | Gatt et al. | 210/610 |
| 5,348,803 A | 9/1994 | Schlaemus et al. | |
| 5,385,675 A | 1/1995 | Vroman et al. | |
| 5,422,011 A | 6/1995 | Avila | |
| 5,523,013 A | 6/1996 | Durbut et al. | |
| 5,618,468 A | 4/1997 | Canevari et al. | |
| 5,728,320 A | 3/1998 | Fiocco et al. | |
| 5,753,127 A | 5/1998 | Riley | |
| 5,885,602 A | 3/1999 | Levy | |
| 5,919,434 A | 7/1999 | Dugstad et al. | |
| 6,054,055 A | 4/2000 | Burlew | |
| 6,194,473 B1 | 2/2001 | Lessard et al. | |
| 6,261,463 B1 | 7/2001 | Jacob et al. | |
| 6,660,698 B2 | 12/2003 | Riley | |
| 7,008,964 B2 | 3/2006 | Clausen et al. | |
| 7,037,946 B1 | 5/2006 | Reinhart et al. | |
| 7,597,809 B1 | 10/2009 | Roberts | |
| 7,655,603 B2 | 2/2010 | Crews | |
| 8,227,383 B2 | 7/2012 | Stokes et al. | |

FOREIGN PATENT DOCUMENTS

| | | |
|---|---|---|
| WO | WO 98/07508 | 2/1998 |
| WO | WO 03/106809 | 12/2003 |
| WO | WO 2005/115603 | 12/2005 |

OTHER PUBLICATIONS

Fink, J. K., "Oil Spill-Treating Agents", *Oil Field Chemicals*, 2003, pp. 292-308, Chapter 19, Gulf Professional Publishing, US.

Venosa, A. D. et al., "The Baffled Flask Test for Dispersant Effectiveness: A Round Robin Evaluation of Reproducibility and Repeatability", *Spill Science & Technology Bulletin*, 2002, pp. 299-308, v. 7, Nos. 5-6, Elsevier Science Ltd, UK.

European Search Report No. 115579, dated Sep. 7, 2007, 4 pages.

* cited by examiner

FLOATING DISPERSANT PASTE

CROSS REFERENCE TO RELATED APPLICATIONS

This application is the National Stage of International Application No. PCT/US2007/025100, filed 7 Dec. 2007, which claims the benefit of U.S. Provisional Application No. 60/898,350 filed 30 Jan. 2007.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The production of hydrocarbons, such as oil and gas, has been performed for numerous years. Occasionally, oil or fuel is released onto the surface of a body of water. This is generally referred to as an "oil spill." When such an event occurs, the oil spill is evaluated and in many cases cleaned up. The accidental release of oil or other hydrocarbons in the marine environment poses a significant threat to offshore, near-shore, and coastal areas. In many cases, immediate action may limit the extent of environmental impact.

One method of cleaning up the oil spill is by dispersing the oil into the water column below the surface to prevent the oil from washing up on shore where it may cause severe environmental damage. Liquid chemical treating agents (e.g., chemical dispersants) are generally used in such methods. Chemical dispersants are typically sprayed over the surface of an oil spill to reduce the interfacial tension between the oil and water and to allow wave action to break the oil spill into very small oil droplets. These small oil droplets disperse the oil into the water column. However, once the liquid dispersant enters the water column, it is no longer available for contacting and dispersing the oil. Hence, if the small droplets miss the oil spill, even by a small distance, they will be ineffective.

Conventional chemical dispersants have limitations that reduce their effectiveness for many real world situations. Conventional chemical dispersants tend to lose their effectiveness as the viscosity of the treated oil increases. Some oils naturally have higher viscosities than others (e.g., Bunker C). Even low viscosity crude oils weather over time into a more viscous liquid as their "light ends" dissipate. Other crude oils form emulsions with water that often have a higher viscosity than the crude oil by itself. Further, oil tends to immediately increase in viscosity upon contact with cold water. The high viscosity of the oil reduces the effectiveness of liquid dispersants by limiting the ability of the dispersant to interact with it. Many currently marketed liquid dispersants may tend to roll off or flow off the surface of the viscous oil and pass into the water column without dispersing the oil.

Another limitation of conventional dispersants is related to their delivery methods via boat or airplane. In these delivery methods, the dispersants are sprayed onto an oil spill as small 0.4 to 0.7 µm droplets because larger droplets tend to penetrate the oil spill. These small droplets, particularly when sprayed from aircraft, are expected to have significant losses due to overspray.

A related problem is that conventional chemical dispersants are clear and cannot be seen on the water or oil spill from an airplane. Thus, responders applying the dispersant may not know how well the dispersant covered the slick resulting in spraying a previously treated area or failing to treat an area. Currently these application problems are somewhat addressed by flying low (e.g. about 100 feet) over an oil spill during application.

Conventional dispersants are comprised of only 40 to 50% dispersing agent. The rest is primarily composed of solvent to increase the chances of the dispersing agent mixing with and dispersing the oil spill. The use of more solvent is good because it increases the likelihood of contact with the oil spill, but detrimental in that it limits the amount of dispersing agent, by weight, that can be used.

In addition, many conventional dispersants have a density greater than seawater. This causes droplets that penetrate or miss the slick to sink into the water column without interacting with the oil. These application problems result in overuse of dispersant, which increases costs.

One method utilized to improve dispersant effectiveness for viscous oils and emulsions involved formulating a more effective carrier solvent. Two such dispersants are COREXIT® 9500 and 9527 developed by ExxonMobil Corp. (manufactured by NALCO Chemical Co.). These dispersants are designed to be more effective because the carrier solvents remain in the oil film and resist extraction of the dispersant into the water column.

Another approach is disclosed in U.S. Pat. No. 4,560,482. This method utilizes a viscous, sticky, gel-like solvent that allows contact of the surfactants with the oil spill for a longer time interval to improve the likelihood that the oil will be dispersed into the water. However, this reference fails to teach low density, droplet size, or visibility of the viscous dispersant liquid.

U.S. Pat. No. 4,197,197 discloses an oil dispersant utilizing a water-soluble polymer and eliminating the hydrocarbon solvent from the formulation. However, this reference fails to teach low density, droplet size, or visibility of the dispersant.

Further, another approach is disclosed in PCT Patent Publication No. WO2005/115603. This reference teaches the use of solid particles including a matrix component and an effective amount of a dispersant component. The solid particles are distributed over the surface of an oil spill and the solid matrix component dissolves to release the surfactant into the oil. The matrix component is oleophilic and does not tend to roll off of viscous oils.

Microbubbles have been used in detergents for altering their density as disclosed in U.S. Pat. No. 5,176,713, but there is no teaching or suggestion to use microbubbles in a oil dispersant formulation.

Accordingly, the need exists for a more efficient dispersant that is persistent, visible when delivered during a spraying operation, is comprised of larger droplets, and tends to float on seawater. Also, a method for effectively and efficiently applying such a dispersant is needed.

SUMMARY OF INVENTION

In one embodiment, an oil spill treatment agent is disclosed. The oil spill treatment agent comprises a viscous dispersant liquid formulated to disperse oil floating on the surface of a body of water, wherein the viscous dispersant liquid is opaque and has a lower density than water. Particularly, the viscous dispersant liquid may be cohesive and persistent and include a viscosifying agent, which may be microballoons. The viscous dispersant liquid may have a density between about 0.80 grams per milliliter and about 1.02 grams per milliliter, an HLB of between about 9.0 and about 12.0, and a viscosity of between about 1,000 centipoise and about 6,000 centipoise.

In particular, the oil spill treatment agent may consist essentially of 3-13 weight percent sorbitan monooleate, 5-15 weight percent polyoxyethylene sorbitan monooleate, 30-50 weight percent polyoxyethylene sorbitan trioleate, 20-40 weight percent alkali metal salt of a dioctyl sulfosuccinate, 5-15 weight percent hydrocarbon or alcohol solvent, and 1-3 weight percent microballoons.

An additional embodiment of the present techniques discloses an oil spill treatment agent comprising at least one surfactant; and a low density viscosifying agent, wherein the surfactant and viscosifying agent are mixed to form a viscous dispersant liquid formulated to disperse oil floating at or near the surface of a body of water. More particularly, the viscous dispersant liquid may have a lower density than water, be opaque and cohesive and persistent and the viscosifying agent may be microballoons having a particle size of between about 25 micrometers and about 90 micrometers.

A third embodiment of the present techniques discloses an oil spill dispersant comprising sorbitan monooleate, polyoxyethylene sorbitan monooleate, polyoxyethylene sorbitan trioleate, an alkali metal salt of a dioctyl sulfosuccinate, a hydrocarbon or alcohol solvent, and microballoons.

A fourth embodiment of the present techniques discloses a method of dispersing oil on a body of water. The method comprising providing a viscous dispersant liquid, wherein the viscous dispersant liquid includes microballoons or gas bubbles; and contacting the oil on the body of water with the viscous dispersant liquid to disperse at least a portion of the oil. The method of contacting the oil may include spraying the viscous dispersant liquid through a nozzle in droplets greater than about 0.7 millimeters in diameter to about 0.5 centimeters in diameter. The viscous dispersant liquid may be sprayed from a height of over about 100 feet above the surface of the body of water.

A fifth embodiment of the present techniques discloses a method of manufacturing an oil spill treating agent. The method comprises mixing selected ingredients to form a viscous dispersant liquid formulated to disperse oil floating on the surface of a body of water, wherein the viscous dispersant liquid is opaque and floats on water.

A sixth embodiment of the present techniques discloses a method of manufacturing an oil spill treating agent. The method comprises mixing at least one surfactant with microballoons to form a viscous dispersant liquid formulated to disperse oil floating on the surface of a body of water.

A seventh embodiment of the present techniques discloses a method of manufacturing an oil spill treating agent. The method comprises mixing 4 to 5 percent by weight sorbitan monooleate, 8 to 10 percent by weight polyoxyethylene sorbitan monooleate, 38 to 45 percent by weight polyoxyethylene sorbitan trioleate, 28 to 38 percent by weight of an anionic surfactant, and 9 to 11 percent by weight of a solvent. The method may further comprise combining the mixture with a viscosifying agent to form a viscous dispersant liquid, wherein the viscosifying agent may comprise microballoons.

An eighth embodiment of the present techniques discloses a method of manufacturing an oil spill treating agent. The method comprises mixing at least one surfactant with microballoons to form a viscous dispersant liquid formulated to disperse oil floating on the surface of a body of water.

In one or more of the specific embodiments of the present techniques, the viscous dispersant paste includes a mixture of different chemical surfactants.

In one or more of the specific embodiments of the present techniques, the dispersant component includes (a) sorbitan monooleate, (b) polyoxyethylene sorbitan monooleate, (c) polyoxyethylene sorbitan trioleate and (d) alkali metal salt of a dioctyl sulfosuccinate.

In one or more of the specific embodiments of the present techniques, the dispersant component may include: (a) sorbitan monooleate (from 3 to 13 wt %), (b) polyoxyethylene sorbitan monooleate (from 5 to 15 wt %), (c) polyoxyethylene sorbitan trioleate (from 30 to 50 wt %) and (d) alkali metal salt of a dioctyl sulfosuccinate (from 20 to 40 wt %).

In one or more of the specific embodiments of the present techniques, the surfactant component occupies 50% or more by weight of the dispersant. In other methods, the surfactant component occupies 70% or more by weight of the dispersant. In still other methods, the surfactant component occupies 90% or more by weight of the dispersant.

BRIEF DESCRIPTION OF THE DRAWINGS

The foregoing and other advantages of the present techniques may become apparent upon reviewing the following detailed description and drawings of non-limiting examples of embodiments in which.

DETAILED DESCRIPTION

Figure 1:
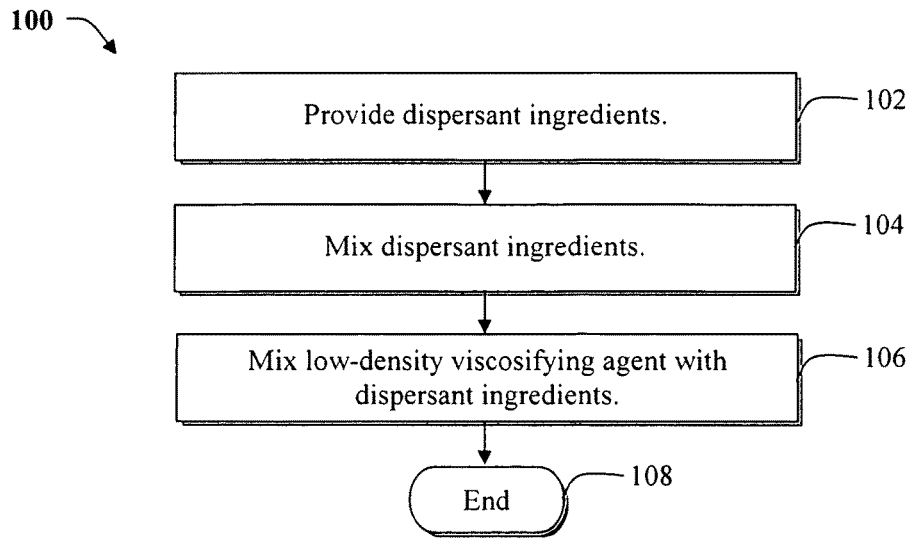
FIG. 1 is an exemplary flow chart of one method of manufacturing a viscous dispersant liquid of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Some embodiments of the present techniques relate to a method and compound for dispersing oil spills and a method of manufacturing the compound. Some embodiments disclose an oil spill treatment agent including at least one part dispersant mixture and at least one part viscosifying agent. Some embodiments disclose a method of manufacturing an oil spill treatment agent including mixing ingredients to form a viscous dispersant liquid (e.g. paste or gel) formulated to disperse oil floating on the surface of a body of water. Some embodiments involve dispersing oil located on the surface of a body of water by a method including providing a viscous dispersant liquid and contacting the viscous dispersant liquid with the oil on or near the body of water in an amount sufficient to disperse at least a portion of the oil, wherein the viscous dispersant liquid may be applied in relatively large droplets (e.g. about 0.5 centimeters in diameter).

The term "oil spill treating agent" includes any known substance for treating oil spills, including dispersants, detergents, herding agents, and other chemicals. The term "dispersant" means any material regarded as a dispersant by persons skilled in the art of oil spill dispersion, and includes any material (solid, liquid, or mixture) that is capable of causing oil, including particularly a crude oil or a refined oil, to begin dispersing into the water column upon making contact with that oil, or shortly after making such contact. When oil is located at or near the surface of a body of water, e.g., as part of an oil spill or slick, a preferred dispersant is one that is capable of breaking up the oil on or near the surface of the body of water, causing the oil to form droplets and to disperse down into the water column where natural forces can degrade the oil droplets. Unless stated otherwise, any material that is a herding agent when applied to oil on a body of water is not a "dispersant."

As used herein, the term "dispersant" may also refer to a "dispersant mixture," which is a dispersant made from a combination of at least two ingredients. Also, the term "dispersant" may encompass any material (a liquid, solid, or mixture) that includes both an effective amount of a dispersant component and an effective amount of a viscosifying agent or viscosifying component, where the two components are mixed, blended, or in some manner combined with each other. For example, one of the viscous dispersant liquids discussed herein that includes an effective amount of a "dispersant" might itself be referred to as a "dispersant" herein even though some portion of the viscous dispersant liquid has no dispersion properties.

The term "dispersant mixture" includes any material that qualifies as a "dispersant" (as defined above) and is the part of a viscous dispersant liquid that causes oil to disperse, but is not a "viscosifying agent," as defined below. Preferably, the dispersant mixture of the present techniques includes one or more surfactants and a solvent.

In accordance with the present techniques, the viscous dispersant mixture may have a density from about 0.8 grams per milliliter (g/ml) to about 1.1 g/ml and the viscosifying agent has a density from about 0.00015 g/ml to about 0.8 g/ml such that, when combined to form the viscous dispersant liquid of the present techniques, the density preferably falls in the range of about 0.75 g/ml to about 1.0 g/ml.

The term "viscosifying agent" refers to any gas, solid, or liquid that increases the viscosity of a liquid mixture. More specifically, the viscosifying agent increases the viscosity of a dispersant mixture such as the mixtures disclosed herein. Preferably, the viscosifying agent may increase the viscosity of the dispersant mixture from about 100 to over about 1,000 centipoise (Cp), although the dispersant mixture may have a viscosity from less than 50 Cp to over 200 Cp and the viscosifying agent may increase the viscosity to about 1,000 Cp to more than 10,000 Cp depending on the specific formula of the viscous dispersant liquid desired, which may depend on the type of oil being treated and the environmental conditions.

Preferably, the viscosifying agent of the present techniques also has a low density and when mixed with the other ingredients, lowers the density of the dispersant. For example, the density of the viscosifying agent is preferably significantly less than 1.0 g/ml and possibly as low as 0.00015 g/ml. More preferably, the viscosifying agent may be a gas bubble, a "microballoon," a particulate solid, or any other agent that increases the viscosity and decreases the density of the dispersant mixture. The term "microballoon" includes any particulate material having a gas-filled or vacuum-filled shell and is capable of being mixed with and/or forming part of a viscous dispersant liquid. A preferred type of microballoon is a "glass bubble," more preferably a SCOTCHLITE™ brand glass bubble manufactured and sold by 3M (Minnesota Mining and Manufacturing Company). Preferably, each microballoon described above and elsewhere herein has a density (or a collection of such microballoons have a bulk density) of at least about 0.05 g/ml, or about 0.10 g/ml, or about 0.15 g/ml, and no more than about 0.50 g/ml, or about 0.55 g/ml, or about 0.60 g/ml. Preferably, the average particle size of the individual microballoons incorporated into a viscous dispersant liquid is about 100 microns or less; or about 150 microns or less; or about 200 microns or less. Advantageously, the microballoons have a bulk density lower than the density of the remaining portion of the viscous dispersant liquid. Hence, the addition of microballoons to the dispersant mixture lowers the density of the dispersant or viscous dispersant liquid to the desired level, such as, for example, below the density of the water being treated, which may have a density of about 1.0 or 1.03 g/ml.

In one or more specific embodiments of the present techniques, the dispersant mixture or component may include any chemical dispersant that is capable of dispersing oil when applied alone or in combination with some other component or agent. The dispersant may be mixed from a plurality of surfactants and one or more solvents. It is contemplated that any chemical dispersant known to those of skill in the art can be used for the dispersant mixture. The dispersant component is preferably more soluble in the oil to which it is being applied than in the water surrounding and supporting the oil. Also, it is preferable that the dispersant component utilize a high percentage (e.g. 95% or more, 85% or more, or 75% or more) of active ingredient, such as a surfactant, and a lower percentage of solvent than is found in prior art dispersants. Examples of chemical dispersants useful as a dispersant component are any of the components identified in U.S. Pat. No. 3,793,218, or U.S. Pat. No. 5,618,468, alone or in combination. The portions of those patents referring to the dispersants, including particularly the chemical formulas of the dispersants, are hereby incorporated by reference, as examples of the "dispersant component" discussed herein.

The dispersant component may also be a combination, e.g., a blend or mixture, of different chemical dispersants. Some of these chemical dispersants are sold under known trademarks, have established proportions, and may be formulated in a carrier solvent. At least one example of a dispersant component is any of the dispersant chemicals in COREXIT® 9500 or COREXIT® 9527 developed by ExxonMobil Corp. and sold by NALCO Chemical Company. At least one formulation of those products is composed of about 9.7 weight percent (wt %) SPAN 80 (sorbitan monooleate); about 19.4 wt % TWEEN 80 (polyoxyethylene sorbitan monooleate); about 28.6 wt % TWEEN 85 (polyoxyethylene sorbitan trioleate), and about 42.3 wt % Aerosol OT (aqueous sodium dioctyl sulfosuccinate). More broadly, an exemplary useful dispersant mixture may include: (a) sorbitan monooleate (from about 5 to 15 wt %), (b) polyoxyethylene sorbitan monooletae (from about 15 to 25 wt %), (c) polyoxyethylene sorbitan trioletae (from about 20 to 40 wt %) and (d) sodium dioctyl sulfosuccinate (from about 25 to 50 wt %). More narrowly, a dispersant mixture may include: (a) sorbitan monooleate (about 10 wt %), (b) polyoxyethylene sorbitan monooletae (about 20 wt %), (c) polyoxyethylene sorbitan trioletae (about 30 wt %) and (d) sodium dioctyl sulfosuccinate (40 wt %). In all cases, the total weight percent will not exceed 100%.

Referring now to the figures, FIG. 1 shows an exemplary flow chart 100 of one embodiment of the manufacturing process of the present techniques. Initially, the dispersant ingredients are provided 102. The dispersant ingredients may be components (a)-(d) above, and may include a solvent. These ingredients are mixed 104. Then, a viscosifying agent is mixed with the dispersant ingredients 106. The second mixing step 106 may occur immediately after the mixing of step 104, or may not occur for several hours, days, weeks, or more afterward. The viscosifying agent may be a low density solid, gas, or microballoons.

In some embodiments, the lower viscosity mixture resulting from step 104 may have a longer shelf life or be easier to pump through a system or store than the final product of the process 100. Some embodiments may include a step of re-mixing the viscous dispersant liquid as there may be some separation of the viscosifying agent and the dispersant mixture during storage. Alternative methods and apparatuses for storing, pumping, mixing and re-mixing the viscous dispersant liquid of the present techniques are known to those of skill in the art.

Figure 2:
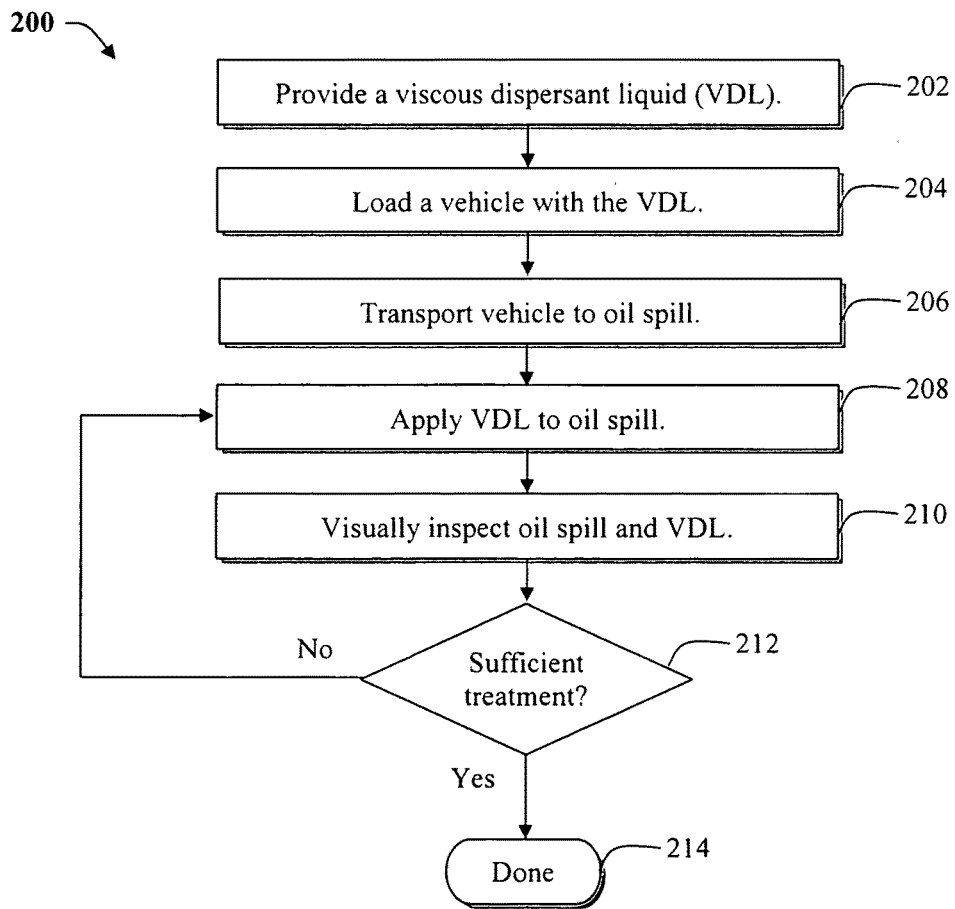
FIG. 2 is an exemplary flow chart of one method of treating an oil spill utilizing a viscous dispersant liquid of the present techniques.

FIG. 2 shows an exemplary flow chart 200 of one embodiment of a method of treating an oil spill utilizing the oil spill treating agent product of the process of FIG. 1 or other embodiment of the present techniques. As such, FIG. 2 may be best understood by concurrently viewing FIG. 1. The chart 200 shows loading the viscous dispersant liquid onto a vehicle 204, transporting the vehicle to an oil spill 206, and applying the viscous dispersant liquid to the oil spill 208. The oil spill is visually inspected 210 either concurrently or just after the application step 208 and if there is sufficient treatment 212 the operation is done 214; if not, the application 208 and inspection steps 210 are repeated until the treatment is sufficient.

Note that the visual inspection step 210 is made more effective and easier by the opaque visible nature of the viscous dispersant liquid of the present techniques. In some alternative embodiments, step 106 of the manufacturing process 100 occurs almost simultaneously with the application step 208 of the treatment process 200.

Figure 3:
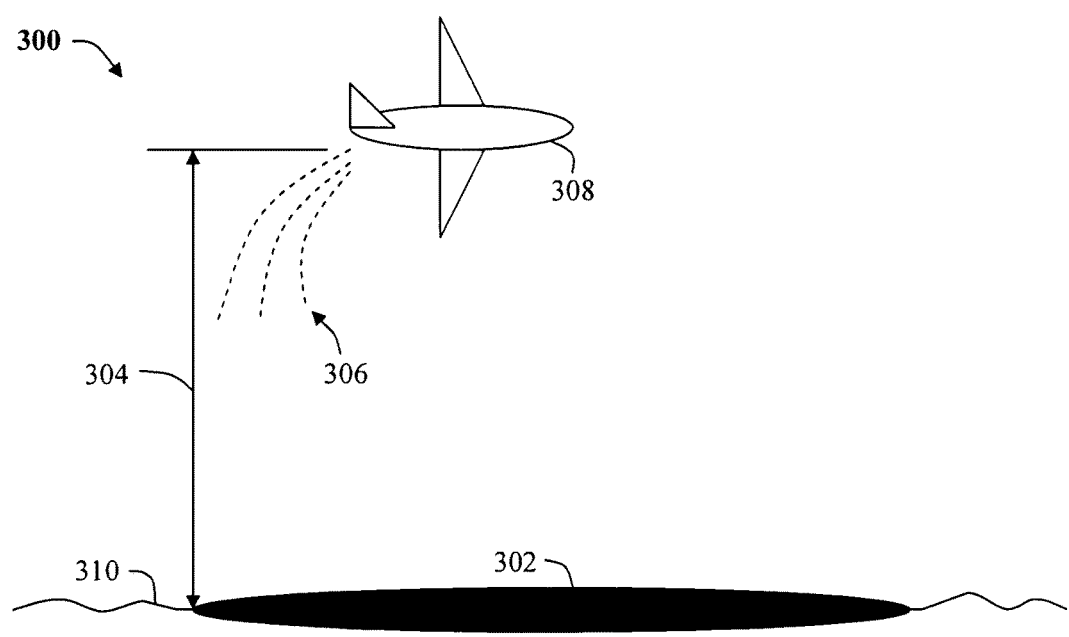
FIG. 3 is an exemplary embodiment of one method of application of a liquid oil spill dispersant agent.

FIG. 3 shows an exemplary delivery method of the viscous dispersant liquid of the present techniques utilizing the oil spill treating agent of the process of FIG. 1 and the treating method of FIG. 2. Accordingly, FIG. 3 may be best understood by concurrently viewing FIGS. 1 and 2. In FIG. 3, the oil spill 302 on the body of water 310 may or may not be highly viscous oil. The plane 308 is flying over the oil spill 302 at a height 304, and spraying a dispersant liquid 306 onto the oil spill 302. The plane 308 may be a jet plane, propeller plane, helicopter, or other flying vehicle. The height 304 may be over about 100 feet, over about 500 feet, or over about 1,000 feet. The dispersant liquid 306 may be the viscous dispersant liquid of the present techniques.

Figure 4A:
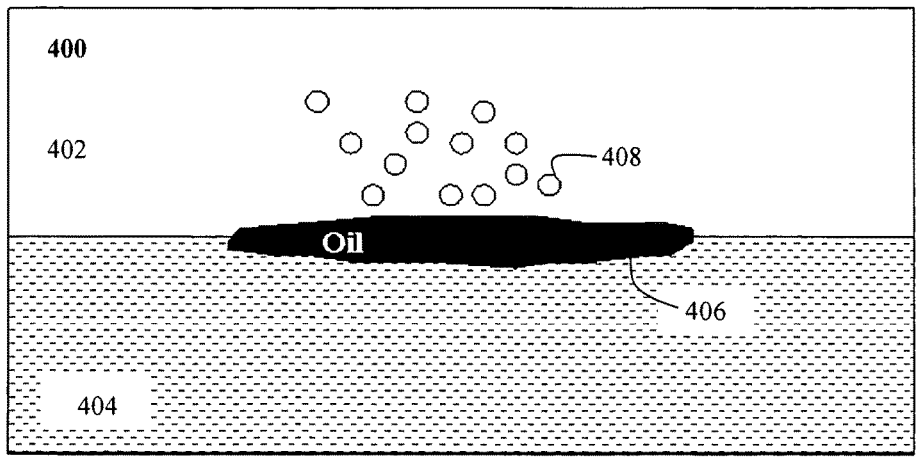
FIGS. 4A-4C are exemplary illustrations of the desired effect of a liquid oil spill dispersant agent.
Figure 4B:
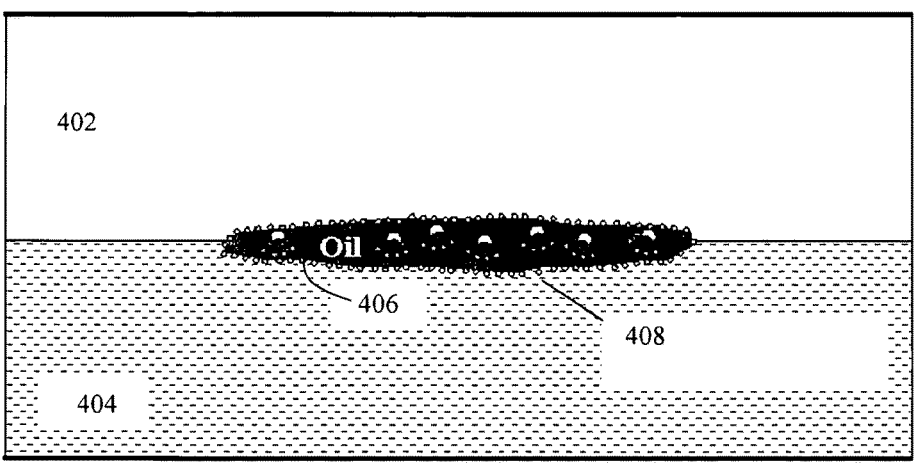
Figure 4C:
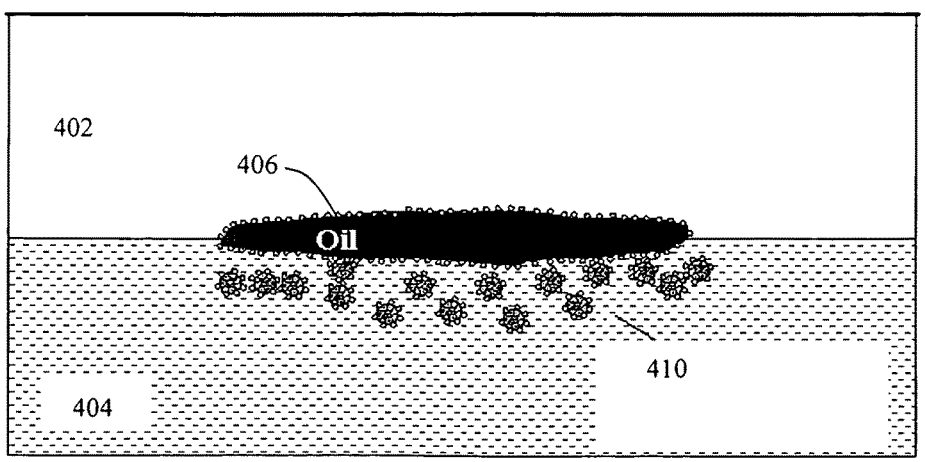

FIGS. 4A-4C show an exemplary illustration of the action of oil spill dispersants, such as the viscous dispersant liquid of the process of FIG. 1. In FIG. 4A, the oil spill 406 is floating on the surface of the water 404 and the dispersant 408 is falling in droplets. In FIG. 4B, the dispersants 408 mix and react with the oil spill 406, causing the oil to separate into droplets when agitated by waves. In FIG. 4C, oil droplets 410 form and pass into the water 404 column because of turbulent mixing.

The action of oil spill dispersants as shown in FIGS. 4A-4C are largely dependant upon the balance of various surfactants, solvents and other agents. For example, conventional oil spill dispersant formulations contain one or more surface-active agents (surfactants) and one or more solvents. Most surfactants are molecules that contain both oleophilic and hydrophilic groups. This structure causes surfactant molecules to diffuse to an oil-water or oil-air interface. Once located at an interface, the surfactants either reduce the interfacial tension or the surface tension of the oil allowing the formation of fine droplets that disperse into the water column due to water movement or agitation. The surfactants may be non-ionic or anionic.

The solvents in conventional dispersants provide at least two functions. First, they reduce the viscosity of surfactant blends and allow efficient application, such as through spray nozzles. Second, solvents promote penetration and mixing of the dispersant in the oil spill or slick.

Figure 5A:
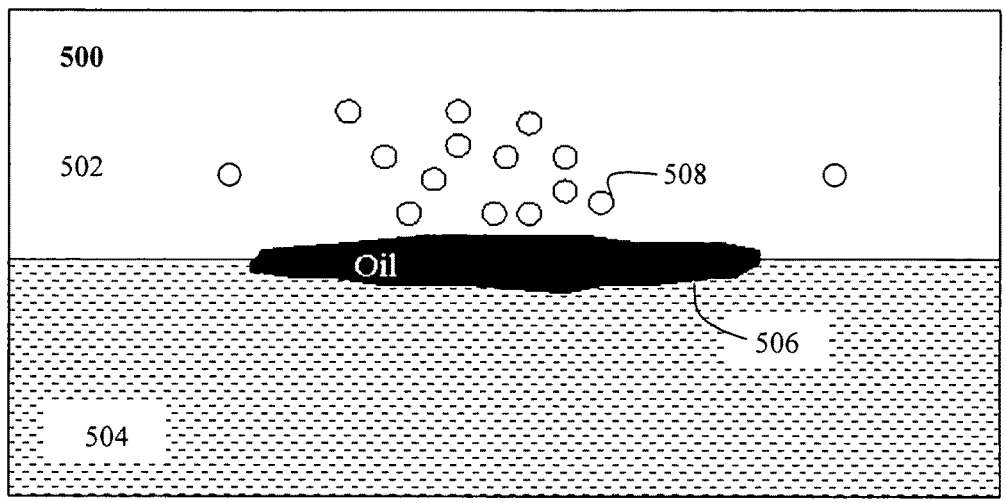
FIGS. 5A-5B are exemplary illustrations of the effect of a liquid oil spill dispersant agent when contacted with highly viscous oil.
Figure 5B:
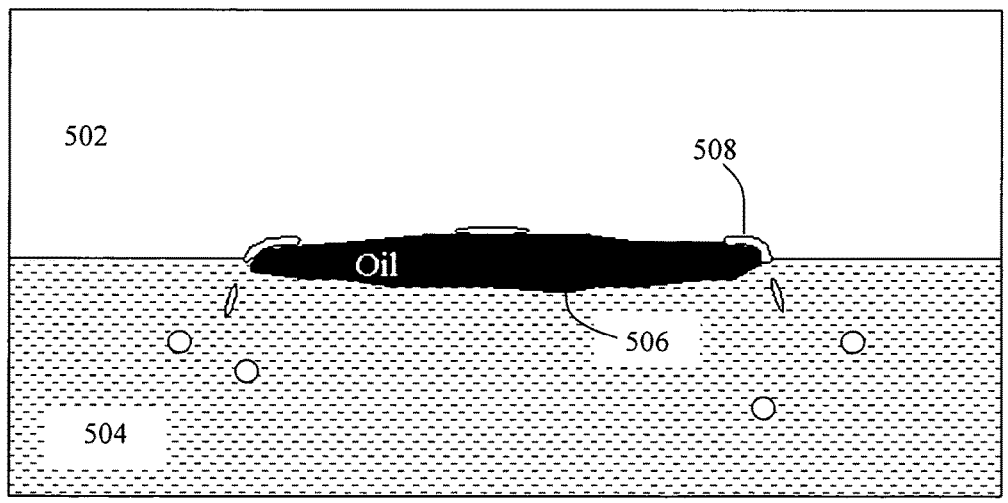

FIGS. 5A-5B show an exemplary illustration of "roll-off." In FIG. 5A, the oil spill 506 is floating on the surface of the water 504 and the dispersant 508 is falling in droplets. In FIG. 5B, the dispersant 508 pools and rolls off of the viscous oil 506 rather than reacting with it. This is one example of a practical problem with the application of conventional liquid dispersants on oil spills.

The action of the dispersants shown in FIGS. 5A-5B relates largely to the viscosity of the oil being treated. Typically, crude oils will increase in viscosity as they age after a spill; either by loss of volatile components such as the "light ends," the formation of emulsions, or by temperature reduction from contact with cold water. As a result, the window of opportunity for dispersant usage can be limited to a certain period of time. For arctic climates, the viscosity of many oils can increase too quickly for dispersants to be effective. When oils lose the lighter components, they also tend to become nearly neutrally buoyant in the water. That is, the oil floats with a significant amount of the slick below the surface. This allows waves to wash over the oil surface more readily than more positively buoyant oils. If the dispersant is too light, it may not contact the viscous oil sufficiently and if it is too hydrophilic, it may become water wet upon water contact which will prevent it from contacting and dispersing the oil.

Some embodiments of the present invention include a viscous dispersant liquid having a gel or paste-like consistency that is cohesive, persistent, visible, and floats on seawater. The viscous dispersant liquid of the present techniques is preferably more cohesive and persistent than other oil spill dispersant formulations or mixtures, which improves effectiveness by holding the liquid together, rather than allowing small pools of the liquid to be separated from the rest of the liquid. In particular, wave action and other physical disturbances are less likely to break up the viscous dispersant gel or paste of the present techniques into smaller droplets that are more likely to disperse into the water column without interacting with the oil. The viscous dispersant liquid of the present techniques "holds together" (e.g. does not form small pools or small droplets) long enough to be effective in dispersing the oil at or near the surface of the body of water. This time period may be about 5 minutes or longer, about one hour or longer, about 10 hours or longer, or about 24 hours or longer depending on the oil and the conditions. The viscous dispersant liquid of the present techniques is also preferably visible or opaque so that it may be visually identified due to its contrast with the oil spill, particularly during application operations in which the liquid is applied by an airplane or helicopter. The preferred embodiment of the viscous dispersant liquid of the present techniques also floats on the surface of the body of water being treated because it has a lower specific gravity than the water. In this manner, the viscous dispersant liquid should remain floating for a period of time sufficient to treat the oil spill. These features may help alleviate or eliminate an issue called "overspray" in which dispersant droplets are blown off target and hit open water. Also this feature will help insure that treated areas are not unnecessarily re-sprayed because an operator cannot see the dispersant on the body of water below.

Beneficially, the present techniques may enhance the process by utilizing effective surfactants with little or no carrier solvent. In addition, the cohesive, persistent, visible, and buoyant nature of the dispersant of the present techniques may be enhanced by mixing tiny microballoons, gas bubbles, or a low density solid with the surfactants. The microballoons preferably have a particle size range of about 25 micrometers to about 90 micrometers. One example of such a product is 3M™ SCOTCHLITE™ S15 Glass Bubbles. An example of a gas bubble that may be used is atmospheric air.

In one or more of the specific embodiments of the present techniques, the surfactant component occupies about 50% or more by weight of the dispersant. In other embodiments, the surfactant component occupies about 70% or more by weight of the dispersant. In still other embodiments, the surfactant component occupies about 90% or more by weight of the dispersant.

In one or more of the specific embodiments of the present techniques, the dispersant includes microballoons. The microballoons may be mixed with the dispersant components in sufficient quantities to form a viscous dispersant liquid that has a paste-like consistency, is visible or opaque, persistent, cohesive, and floats on water. In one or more embodiments, the dispersant including microballoons may have a specific density from about 0.80 grams per milliliter (g/ml) to about 1.02 g/ml.

Some embodiments of the improved dispersant formulation comprise at least one surfactant formulated to disperse oil in water. Such surfactants may include, but are not limited to: (a) a sorbitan monoester of a $C_{10}$-$C_{20}$ aliphatic monocarboxylic acid (e.g., Span 80), (b) a polyoxyethylene glycol sorbitan monooleate of a $C_{10}$-$C_{20}$ aliphatic monocarboxylic acid (e.g., Tween 80), (c) a polyoxyethylene glycol sorbitan trioleate of a $C_{10}$-$C_{20}$ aliphatic monocarboxylic acid (e.g., Tween 85), (d) an alkali metal salt of a dioctyl sulfosuccinate (e.g., Aerosol OT), (e) a hydrocarbon or alcohol solvent (e.g., isopropyl alcohol or ExxSol® D80), and (f) microballoons having a particle size range of about 25 micrometers (μm) to about 90 μm (e.g., 3M™ SCOTCH-LITE™ Glass Bubbles).

In some embodiments of the present techniques, the dispersant component may include: (a) sorbitan monooleate (from 3-13 wt %), (b) polyoxyethylene sorbitan monooleate (from 5 to 15 wt %), (c) polyoxyethylene sorbitan trioleate (from 30 to 50 wt %) and (d) alkali metal salt of a dioctyl sulfosuccinate (from 20 to 40 wt %).

A more specific embodiment of the dispersant is represented by the formulation in Table 1 below:

TABLE 1

| Component | HLB* | % by mass | % by volume | Density (g/ml) |
|---|---|---|---|---|
| (1) Span 80 (sorbitan monooleate) | 4.3 | 4.3 | 4.00 | 0.986 |
| (2) Tween 80 (polyoxyethylene sorbitan monooleate) | 15 | 8.6 | 7.50 | 1.076 |
| (3) Tween 85 (polyoxyethylene sorbitan trioletae) | 11 | 38.6 | 35.25 | 1.028 |
| (4) Aerosol OT 100 | 10 | 36.6 | 31.25 | 1.1 |
| (5) Isopropyl alcohol (amount to make 10% of total by mass) | — | 10.00 | 12.00 | 0.785 |
| (6) 3M S15 Microballoons | — | 1.9 | 10.00 | 0.18 |
| Total | 10.7 | 100 | 100 | 0.94 |

In Table 1 above, HLB refers to the hydrophilic-lipophilic balance of the particular ingredient and the mixture. This number is an indication of whether the compound will be attracted more to oil or more to water. A number between about ten (10) and about sixteen (16) is preferable.

Another specific alternative embodiment may be represented by the formulation in Table 2 below:

TABLE 2

| Component | HLB* | % by mass | % by volume | Density (g/ml) |
|---|---|---|---|---|
| (1) Span 80 (sorbitan monooleate) | 4.3 | 4.9 | 4.6 | 0.986 |
| (2) Tween 80 (polyoxyethylene sorbitan monooleate) | 15 | 9.9 | 8.6 | 1.076 |
| (3) Tween 85 (polyoxyethylene sorbitan trioletae) | 11 | 44.3 | 40.3 | 1.028 |
| (4) Aerosol OT 100 | 10 | 29.0 | 24.7 | 1.1 |
| (5) Isopropyl alcohol (amount to make 10% of total by mass) | — | 10.00 | 11.9 | 0.785 |
| (6) 3M S15 Microballoons | — | 1.9 | 10.00 | 0.18 |
| Total | 10.7 | 100 | 100 | 0.94 |

In yet another specific alternative embodiment, the isopropyl alcohol may be replaced with a different surfactant such as ExxSol® D80. In this embodiment, the weight or mass percent (wt %) may be from about six wt % to about 14 wt %, from about eight wt % to about 12 wt %, or about 10 wt %.

Various methods may be utilized for delivering an oil spill treatment agent to an oil spill on a body of water. More particularly, these methods relate to oil dispersants. One benefit of dispersants over other oil-spill response options is the speed of application. Conventional dispersants are typically sprayed as a liquid through nozzles from a variety of application platforms or vehicles such as boats, helicopters, or airplanes. When an oil spill is on the surface of a body of water, a preferred method includes loading a quantity of dispersant onto an airplane, flying the airplane over the oil spill, and delivering the dispersant onto the surface of the oil spill. Alternatively, the dispersant may be loaded onto any type of vehicle, such as a small boat or a larger ship.

In one specific embodiments of the present techniques, the delivery method includes dropping or otherwise dispensing the viscous dispersant liquid onto the oil spill from above the oil spill, most preferably from an airplane or other airborne vehicle. In preferred embodiments, the viscous dispersant gel or paste is delivered using methods generally known in the art. Specifically, the viscous dispersant paste is delivered using externally located nozzles and piping connected to a central reservoir located on the interior of the vehicle, wherein the central reservoir holds the viscous dispersant paste.

In some embodiments, the delivery system evenly distributes the dispersant over a portion or all of an oil spill as the airborne vehicle flies over. In at least one embodiment, each of the dispersant droplets has a size and weight such that it can be accurately dropped from a high altitude and still hit the desired location on the oil spill, even in inclement weather, e.g., rain, high winds, or storms. Preferably, the droplets will be greater than about 0.7 millimeters (mm) in diameter, or greater than about 0.1 centimeters (cm), or in the range of about 0.5 cm to about 1.0 cm in diameter (e.g. approximately "pea size"). Although propeller driven airplanes are currently used for aerial delivery of dispersants, at least one version of the delivery method includes use of a jet airplane, which is capable of flying at higher speeds than propeller driven planes, and thus is capable of providing a quicker delivery of dispersant than provided by propeller driven planes (measured time wise from airplane take-off to oil spill). Further, the oil spill treatment agent, dispersant, or viscous dispersant liquid described herein can be accurately dropped onto an oil spill from a higher altitude than can conventional liquid dispersants, because the wind is less likely to diffuse or alter the downward trajectory of the viscous dispersant liquid to the extent it does the conventional liquid dispersants. This is because larger dispersant droplets are possible when using the viscous dispersant liquid of the present techniques. Particles may also be delivered to a marine oil spill using marine vehicles (e.g., boats or ships).

A number of advantages are contemplated in an oil dispersant delivery method that utilizes a jet airplane. For example, as noted above, the jet airplanes are faster than propeller driven planes. Further, jet airplanes can typically hold larger payloads than propeller planes. At least one reason propeller driven planes are currently used to deliver dispersants to oil spills is because the dispersants are low-viscosity liquids, and there is a need for conventional liquid dispersants to be delivered at relatively low altitudes, e.g., 100 feet or less above the water surface. At least one reason for such low altitudes is the need (or desire) to ensure the liquid dispersants land on the oil spill after being discharged from the airplane or other vehicle. Furthermore, to function effectively, the conventional liquid dispersants should be delivered as very small droplets, e.g., 0.5 mm or less in diameter. Such small diameters are beneficial, even necessary, because larger droplets tend to penetrate the oil film and interact with the seawater by either passing into the water column or "herding" the oil. Herding refers to a situation where surfactant molecules spread in a monolayer over the surface of the water and move the oil slick across the surface rather than dispersing the oil into the water column as desired. The viscous dispersant liquid can be delivered through nozzles forming droplets with a sufficiently large size so that it can experience high falling velocities following discharge from an airplane or other vehicle. The viscous dispersant droplets can penetrate the oil slick (due in part to the velocity and force upon striking the oil surface), but their buoyancy causes them to float back to the surface where they can interact with the oil film. Accordingly, by providing larger droplets than the droplets of low-viscosity liquid dispersants, viscous dispersants are more amenable to delivery from jet airplanes which are capable of flying at higher speeds than propeller planes.

In some specific embodiments, a viscous dispersant liquid and oil on a body of water are provided. The oil is contacted by the viscous dispersant liquid in order to disperse at least a portion of the oil. Preferably, the viscous dispersant liquid is the viscous dispersant liquid described in various embodiments of the present techniques.

Some of the embodiments of the present techniques include a method of treating an oil spill, comprising providing an oil spill treatment agent, which may be the dispersant or viscous dispersant liquid of the present techniques, placing the treatment agent on a vehicle, the treatment agent on the vehicle preferably being in an amount sufficient to disperse oil forming part of an oil spill located on the surface of a body of water when the dispersant is placed in contact with the oil.

In yet other specific embodiments, a method of dispersing oil located on the surface of a body of water includes placing on an airplane an oil spill treatment agent, flying the airplane over oil located on the surface of a body of water; and dropping the oil spill treatment agent onto the upper surface of the oil spill from the airplane when the airplane is flying at an altitude of about 100 feet or more over the oil spill, wherein the treatment agent is cohesive, persistent, visible and floats on water, resulting in dispersion of some or all of the oil spill.

In one or more of the specific embodiments of the present techniques, the dispersant includes microballoons. The microballoons may be mixed with the dispersant components in sufficient quantities to form a viscous dispersant liquid that takes on a paste-like consistency, is visible or opaque, persistent, cohesive, and floats on water. More specifically, the viscous dispersant liquid may have a specific density from about 0.80 g/ml to about 1.02 g/ml and a viscosity from about 1,000 centipoise (cP) to about 10,000 cP.

Various embodiments of the present techniques are described below, at least some of which are also recited in the claims. In some specific embodiments, the oil spill treating agent may be manufactured by mixing all but one of the components, then mixing the final component at a later time. This process may be beneficial by permitting longer storage times and easy, more rapid transport through pipes or other systems. The final ingredient may be mixed on-site, or within a few hours or minutes of applying the oil spill treatment to oil floating on a body of water. In one embodiment of the present techniques, the various surfactants and solvents may be mixed together to form a low-viscosity dispersant liquid and a viscosifying agent may be added at a later time. The viscosifying agent may be microballoons, gas bubbles, or low density solid particles. The viscosifying agent may be added at any time, including via the nozzle assembly concurrently with the delivery of the dispersant to the oil spill.

In one embodiment of the present techniques, the components (a) sorbitan monooleate, (b) polyoxyethylene sorbitan monooleate, (c) polyoxyethylene sorbitan trioleate, and (d) alkali metal salt of a dioctyl sulfosuccinate (e.g. Aerosol OT) are mixed together until the Aerosol OT is completely dissolved. After the Aerosol OT has completely dissolved, the viscosifying agent (e.g. microballoons) may be mixed in until a viscous dispersant liquid has formed. The mixture may have a viscosity of between about 50 centipoise (cP) and about 250 cP and a density of over about 1.03 g/ml before the low-density viscosifying agent is mixed with the other components. The low-density viscosifying agent may be mixed with the other components minutes, hours, days, months, or more after the other components are mixed. The low-density viscosifying agent preferably increases the viscosity of the mixture to about 1,000 cP to about 10,000 cP and decreases the density to about 0.80 g/ml to about 1.02 g/ml. In one preferred embodiment, the viscous dispersant liquid is a white paste-like substance with a viscosity of between about 5,000 cP and about 6,000 cP at about 20° C. and a shear rate of 100 sec$^{-1}$ and a density of between about 0.92 g/ml to about 0.96 g/ml at about 20° C.

Some embodiments of the oil spill treatment may be mixed using standard mixing equipment and techniques known to those of skill in the art. Advantageously, the viscous dispersant liquid may also be transported, applied and stored using standard equipment known to those of skill in the art.

The effectiveness of a dispersant in relation to its ability to remove oil spills from the water surface can be measured qualitatively, or in different more quantitative ways. A qualitative technique for measuring dispersion effectiveness is the Paddle Mixer Dispersant Efficiency Test, described below in the examples. A quantitative dispersion effectiveness test is the EXDET Dispersant Effectiveness Test (Becker, K. W., Walsh, M. A., Fiocco, R. J., Curran, M. T., "A New Laboratory Method for Evaluating Oil Spill Dispersants" International Oil Spill Conference pp. 5407-5510 (Tampa, Fla. 1993) or the EPA Baffled Flask Test (Venosa, A. D., King, D. W., and Sorial, G. A., "The Baffled Flask Test for Dispersant Effectiveness: A Round Robin Evaluation of Reproducibility and Repeatability," Spill Science & Technology Bulletin, 2002, 7(5-6), 299-308). Some other tests include, for example, wave basin tests, broken ice tests, finite difference models, the Mackay test, the rotating flask test, and others known to those of skill in the art.

Examples

An embodiment of the dispersant of the present techniques was tested on three heavy California crude oils that are known to challenge conventional dispersants due to their higher viscosity. Two crude oils that are more easily dispersed were also tested. The tests were carried out using a 10 m×1.2 m×1.2 m deep wave tank filled with simulated seawater. In a typical test, 750 ml of the test oil was placed on the seawater within the test area of the tank and the wave generator activated. Then the dispersant (either COREXIT® 9500 or the viscous dispersant liquid in one preferred embodiment) was applied using a syringe to ensure that both dispersants contacted the test oil in the desired dispersant to oil ratio (DOR). The wave generator was operated for about 15 minutes using the same settings for all tests. After approximately 15 minutes, the undispersed oil remaining in the test area on the seawater surface was collected and weighed to calculate the amount of dispersion.

Figure 6:
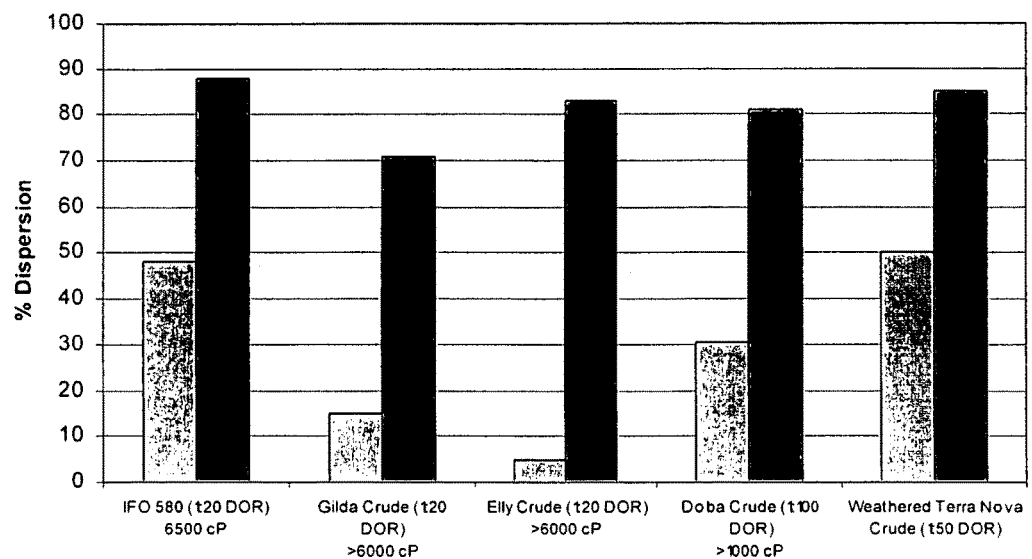
FIG. 6 is an exemplary chart illustrating the results of a dispersion test of one embodiment of the dispersant liquid of the present invention.

For the heavy California crude oils, a standard 1:20 DOR was used for both the viscous dispersant liquid of a preferred embodiment of the present techniques and COREXIT® 9500. For the more easily dispersed crude oils, lower DORs (e.g. 1:50 and 1:100) were tested to evaluate the capacity of the viscous dispersant liquid of a preferred embodiment of the present techniques to treat more oil with less dispersant than is possible with COREXIT® 9500. The results of the tests are shown in the chart of FIG. 6. The chart of FIG. 6 compares the percentage of oil dispersion for the dispersant of the present techniques (right bar) next to COREXIT® 9500 (left bar) for various crude oil types, as indicated.

As is apparent from the chart, the viscous dispersant liquid of a preferred embodiment of the present techniques disperses a greater percentage of the oil than the known dispersant COREXIT® 9500. The viscous dispersant paste increased effectiveness when applied to highly viscous oils and showed increased effectiveness on lower viscosity oils when applied in a lower dispersant to oil ratio.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. An oil spill treatment agent comprising:
   an opaque, viscous dispersant liquid comprising:
   about 3-13 weight percent of sorbitan monooleate,
   about 5-15 weight percent of polyoxyethylene sorbitan monooleate,
   about 30-50 weight percent of polyoxyethylene sorbitan trioleate,
   about 20-40 weight percent of an alkali metal salt of a dioctyl sulfosuccinate,
   about 6-14 weight percent of hydrocarbon or alcohol solvent, and
   about 1-3 weight percent of microballoons
   wherein the viscous dispersant liquid is formulated to be applied directly to a surface of a body of water to disperse oil floating on the surface of the body of water and has a density between about 0.80 grams per milliliter (g/ml) and about 1.02 g/ml; and
   further wherein the viscous dispersant liquid is in the form of droplets having diameter within the range from 0.5 cm to 1.0 cm.

2. The oil spill treatment agent of claim 1, wherein the opaque, viscous dispersant liquid further comprises one of gas bubbles and low density solids.

3. The oil spill treatment agent of claim 1, wherein the viscous dispersant liquid has a density between about 0.92 g/ml and about 0.96 g/ml.

4. The oil spill treatment agent of claim 1, wherein the viscous dispersant liquid has a hydrophilic-lipophilic balance between about 9.0 and about 12.0.

5. The oil spill treatment agent of claim 1, wherein the viscous dispersant liquid has a hydrophilic-lipophilic balance between about 10.5 and about 10.9.

6. The oil spill treatment agent of claim 1, wherein the viscous dispersant liquid has a viscosity between about 1,000 centipoise (cP) and about 10,000 cP.

7. The oil spill treatment agent of claim 1, wherein the viscous dispersant liquid has a viscosity between about 5,000 centipoise (cP) and about 6,000 cP.

8. The oil spill treatment agent of claim 1, wherein the solvent comprises isopropyl alcohol.

9. The oil spill treatment agent of claim 1, wherein the microballoons have a particle size of about 25 micrometers to about 90 micrometers.

* * * * *